(12) United States Patent  (10) Patent No.: US 8,746,784 B2
Hanakawa  (45) Date of Patent: Jun. 10, 2014

(54) VEHICLE FRONT BODY STRUCTURE

(71) Applicant: Honda Motor Co., Ltd., Tokyo (JP)

(72) Inventor: Hidenari Hanakawa, Wako (JP)

(73) Assignee: Honda Motor Co., Ltd, Tokyo (JP)

( * ) Notice: Subject to any disclaimer, the term of this patent is extended or adjusted under 35 U.S.C. 154(b) by 0 days.

(21) Appl. No.: 13/743,726

(22) Filed: Jan. 17, 2013

(65) Prior Publication Data

US 2013/0221708 A1  Aug. 29, 2013

(30) Foreign Application Priority Data

Feb. 27, 2012 (JP) ................................. 2012-040030

(51) Int. Cl.
*B62D 25/08* (2006.01)
(52) U.S. Cl.
USPC ................................ 296/193.09; 296/187.09
(58) Field of Classification Search
USPC ............. 296/193.09, 203.02, 197.09, 187.03, 296/203.01; 280/274
See application file for complete search history.

(56) References Cited

U.S. PATENT DOCUMENTS 6,382,709 B1 * 5/2002 Chirifu et al. ............... 296/193.1
7,552,569 B2 * 6/2009 Rotherroe ....................... 52/840

FOREIGN PATENT DOCUMENTS

JP  3-96280 U  10/1991
JP  2009-269487 A  11/2009

* cited by examiner

*Primary Examiner* — Joseph Pape
*Assistant Examiner* — Dana Ivey
(74) *Attorney, Agent, or Firm* — Westerman, Hattori, Daniels & Adrian, LLP

(57) ABSTRACT

A vehicle front body structure includes a pair of damper housings, a pair of damper bases, and a dashboard upper. Each of the damper bases includes a damper base upper wall, three damper fixing portions, three dash upper fixing portion, and a ridge line portion extending along the outer circumference of the damper base upper wall. The three damper fixing portions and the three dash upper fixing portions are alternately disposed on an imaginary circle. Sections of the ridge line portion outside each of the dash upper fixing portions and each of the dash upper fixing portion are located outside the imaginary circle, and each of sections of the ridge line portion between the damper fixing portion and the dash upper fixing portion intersects the imaginary circle so that the ridge line portion is formed in a substantially star shape in plan view.

7 Claims, 10 Drawing Sheets

FIG. 4
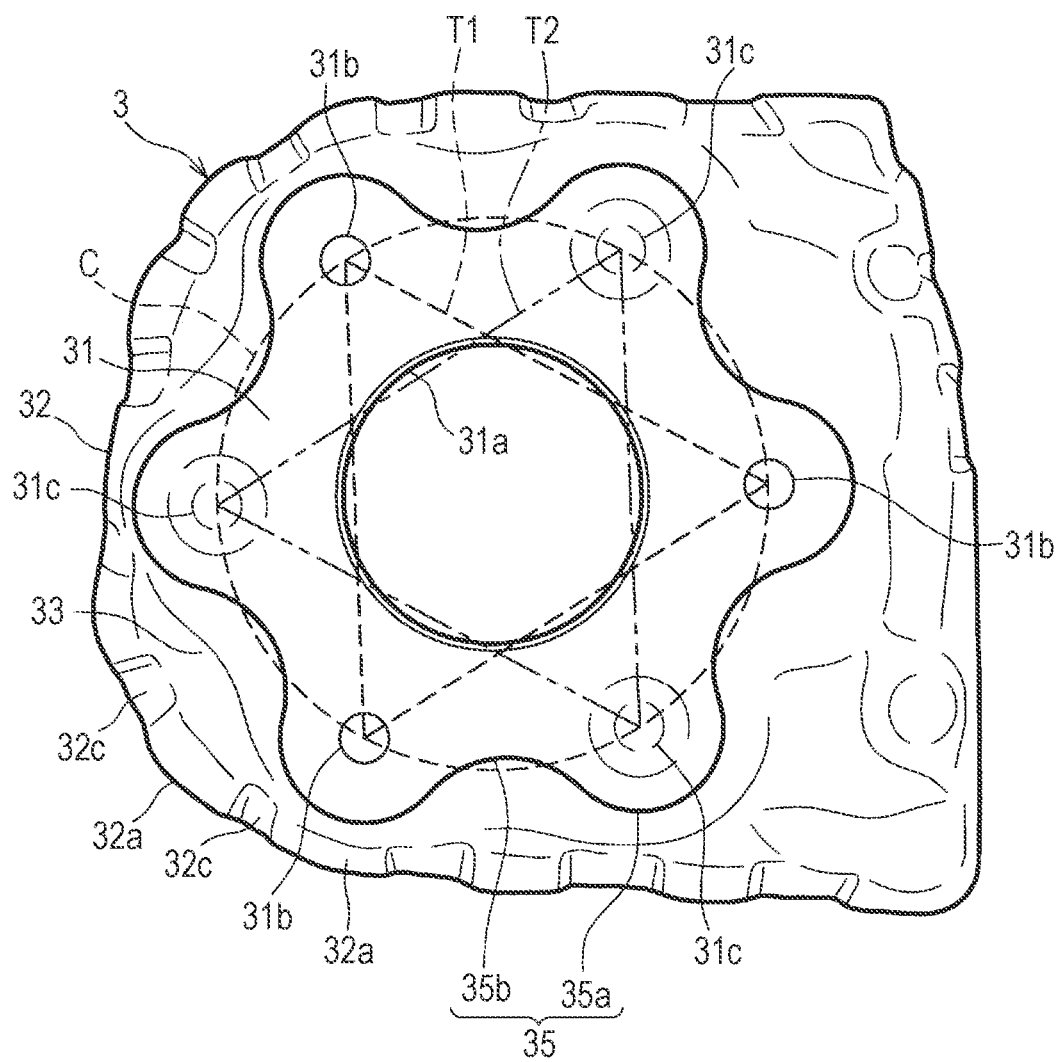
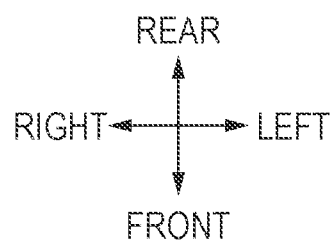

VEHICLE FRONT BODY STRUCTURE

CROSS REFERENCES TO RELATED APPLICATIONS

The present application claims priority under 35 U.S.C. §119 to Japanese Patent Application No. 2012-040030, filed Feb. 27, 2012, entitled "Vehicle Front Body Structure." The contents of this application are incorporated herein by reference in their entirety.

TECHNICAL FIELD

The present disclosure relates to a vehicle front body structure and, in particular, to a vehicle front body structure of a damper housing and its vicinity in a power unit room.

BACKGROUND

When an existing vehicle is running and if the running load is input from a tire to a damper base that forms the upper surface of a damper housing and, therefore, the middle portion of the damper base is deformed, an adverse effect on the stability and controllability, noise, and vibration of the vehicle may arise. Accordingly, the strength of the damper base is increased by adding a reinforcing member to the damper base or forming a bulging portion or a rib in the damper base. For example, Japanese Unexamined Utility Model Registration Application Publication No. 3-96280 describes a vehicle front body structure in which part of an apron reinforcement that extends in the front-rear direction of a vehicle on the outer side of the vehicle in the width direction further extends up to the inner side of the suspension tower (damper housing) in the width direction of the vehicle as a reinforcement member so that the reinforcement member and the suspension tower form a closed cross-section. In addition, Japanese Unexamined Patent Application Publication No. 2009-269487 describes a vehicle front body structure having an increased strength by forming a doom-shaped bulging portion in the inside of a bolt attachment unit of the damper base.

SUMMARY

However, if, for example, a reinforcement member is provided in order to make the damper housing have a dual structure, as described in Japanese Unexamined Utility Model Registration Application Publication No. 3-96280, the number of components increases. Thus, a variety of disadvantages, such an increase in weight, an increase in manufacturing steps, and an increase in cost, arise. In addition, if a bulging portion or a rib is formed in the upper surface of the damper base, it is difficult to weld another component on the upper surface of the damper base. Furthermore, if the sheet thickness of the damper base is increased in order to increase the strength of the damper base, it is difficult to use spot welding (in particular, three-layer spot welding). In addition, the weight of the damper base increases. As a result, bolt fastening needs to be employed and, thus, the number of components increases, and flexibility in the design is reduced.

The present application describes a vehicle front body structure capable of increasing the strength of a damper base while preventing an increase in the number of components and a reduction in flexibility in the design.

According to an embodiment of the present application, a vehicle front body structure includes a pair of damper housings that form right and left side walls of a power unit room of a vehicle, where each of the damper housings contains a damper of a suspension, and a damper base disposed on an upper portion of each of the damper housings, where the damper base allows the damper to be fixed thereto. The damper base includes a damper base upper wall that allows the damper to be attached thereto, a plurality of damper fixing portions used to fix the damper to the damper base upper wall, and a ridge line portion extending along an outer circumference of the damper base upper wall. The damper fixing portions are disposed on an imaginary circle. A section of the ridge line portion outside each of the damper fixing portions is located outside the imaginary circle, and a section of the ridge line portion between every pair of the adjacent damper fixing portions intersects the imaginary circle so that the ridge line portion is formed in a substantially wave shape in plan view.

In such a structure, in the ridge line portion extending along an outer circumference of the damper base upper wall, a section of the ridge line portion outside each of the damper fixing portions is located outside the imaginary circle, and a section of the ridge line portion between every pair of the adjacent damper fixing portions intersects the imaginary circle so that the ridge line portion is formed in a substantially wave shape in plan view. Accordingly, although the damper fixing portions are disposed inside the ridge line portion, the ridge line portion can be made closer to the imaginary circle. Thus, the area of the damper base upper wall can be minimized and, therefore, the strength of the damper base upper wall can be increased. In this manner, film surface distortion of the damper base upper wall can be prevented. Thus, the stability and controllability can be improved, and noise and vibration can be reduced. In addition, since the need for a reinforcing member or a bulging portion provided on the damper base upper wall is eliminated, the damper base upper wall can be made flat and, therefore, the other members can be easily welded to the damper base upper wall. Furthermore, since the ridge line portion is formed in a substantially wave shape, the rigidity can be maintained even when the sheet thickness of the damper base upper wall is reduced. As a result, three-layer spot welding on the damper base upper wall can be employed. Thus, the number of components can be reduced, and flexibility in the design can be increased. Still furthermore, since the ridge line portion is formed in a substantially wave shape, the bending angle of the section of the ridge line portion between the damper fixing portions that intersects the imaginary circle can be gentle. Thus, a difference in the circumferential length before and after one-piece press forming of the damper base can be reduced and, therefore, the occurrence of a wrinkle on the damper base upper wall can be prevented.

The vehicle front body structure can further include a dashboard upper that forms an upper portion of a dashboard that separates the power unit room from a vehicle compartment. The dashboard upper can include a dash-upper front portion that extends, in a front direction of the vehicle, up to at least a position immediately above the damper base, and right and left end portions of the dash-upper front portion are fixed to the damper base upper walls. The damper base can include three of the damper fixing portions and three dash upper fixing portions used to fix the dash-upper front portion to the damper base upper wall. The three damper fixing portions and the three dash upper fixing portions can be alternately disposed on the imaginary circle, and imaginary lines extending between every pair of the damper fixing portions can form a regular triangle, and imaginary lines extending between every pair of the dash upper fixing portions can form a regular triangle. A section of the ridge line portion outside each of the damper fixing portions and a section of the ridge line portion outside each of the dash upper fixing portions can be located outside the imaginary circle, and a section of the ridge line portion between the damper fixing portion and the dash upper fixing portion can intersect the imaginary circle so that the ridge line portion is formed in a substantially star shape in plan view.

In such a structure, the three damper fixing portions and the three dash upper fixing portions are alternately arranged on the imaginary circle. The three damper fixing portions are located at the vertexes of an imaginary regular triangle, and the three dash upper fixing portions are located at the vertexes of an imaginary regular triangle. A section of the ridge line portion outside one of the damper fixing portions and a section of the ridge line portion outside one of the dash upper fixing portions are located outside the imaginary circle. A section of the ridge line portion between the damper fixing portion and the dash upper fixing portion intersects the imaginary circle so that the ridge line portion is formed in a substantially star shape in plan view. Accordingly, although the damper fixing portions and the dash upper fixing portions are disposed inside the ridge line portion, the area of the damper base upper wall can be minimized and, therefore, the strength of the dash upper fixing portion can be increased. As a result, film surface distortion of the damper base upper wall can be prevented. Thus, the stability and controllability can be improved, and noise and vibration can be reduced. In addition, the need for a reinforcing member or a bulging portion provided on the damper base upper wall is eliminated. Accordingly, the damper base upper wall can be made flat and, therefore, the dash-upper front portion can be easily welded to the damper base. Furthermore, since the ridge line portion is formed in a substantially star shape, the rigidity can be maintained even when the sheet thickness of the damper base upper wall is reduced. Thus, three-layer spot welding on the damper base upper wall can be employed. In this manner, the number of components can be reduced, and flexibility in the design can be increased. Still furthermore, since the ridge line portion is formed in a substantially star shape, the bending angle of a section of the ridge line portion between the damper fixing portion and the dash upper fixing portion that intersects the imaginary circle can be gentle. Thus, the difference in the circumferential length before and after one-piece press forming of the damper base can be reduced and, therefore, the occurrence of a wrinkle on the damper base upper wall can be prevented.

A plurality of housing connecting portions can be separately formed on a circumferential edge at the lower end of a side wall of the damper base, and a notch portion can be formed between every pair of adjacent housing connecting portions by cutting the lower end portion of the side wall of the damper base up to at least an imaginary connection line passing through the centers of the housing connecting portions.

In such a structure, the notch portion is formed between every pair of adjacent housing connecting portions by cutting the lower end portion of the damper base side wall at least up to the imaginary connection line that passes through the centers of the housing connecting portions. Accordingly, when, for example, the damper base is subjected to one-piece press forming, the difference in the circumferential length before and after one-piece press forming can be reduced by the notch portions and, therefore, the occurrence of a wrinkle can be prevented. In addition, the weight of the damper base can be reduced by the presence of the notch portions.

A plurality of housing connecting portions can be separately formed on a circumferential edge at the lower end of a side wall of the damper base, and a longitudinal recessed bead that extends in an up-down direction can be formed between every pair of adjacent housing connecting portions so as to space apart the side wall of the damper base from the damper housing.

In such a structure, since the longitudinal recessed bead that extends in the up-down direction is formed between every pair of adjacent housing connecting portions so as to space apart the damper base side wall from the damper housing, the rigidity of the damper base can be increased. In addition, by providing a space between the damper base and the damper housing at positions at which welding is not necessary, the occurrence of noise and vibration can be reduced.

The vehicle front body structure can further include a pair of right and left upper members extending in a front-rear direction of the vehicle on right and left sides of the power unit room and a stiffener disposed on top of the dash-upper front portion attached to the damper base upper wall, where the stiffener extends between the right and left damper housings together with the dash-upper front portion. Right and left end portions of the stiffener can be fixed to the right and left upper members, respectively.

In such a structure, since an end portion of the stiffener that is disposed between the damper housings together with the dash-upper front portion is fixed to the upper member, deformation of the damper base upper wall can be more effectively reduced. In addition, since the running load can be distributed over the upper members, the rigidity of the whole body can be increased more. As a result, the stability and controllability of the vehicle can be improved, and noise and vibration can be reduced.

The vehicle front body structure can further include a pair of right and left upper members extending in a front-rear direction of the vehicle on right and left sides of the power unit room and a stiffener disposed on top of the dash-upper front portion attached to the damper base upper wall, where the stiffener extends between the right and left damper housings together with the dash-upper front portion. The stiffener can include a bulging portion that bulges in an upward direction of the vehicle and that forms a closed cross-section between the stiffener and the dash-upper front portion, and the bulging portion can extend in the right-left direction up to positions immediately above the right and left upper members.

In such a structure, the stiffener disposed between the damper housings together with the dash-upper front portion has the bulging portion that form a closed cross-section together with the dash-upper front portion. In addition, the bulging portion extends in the right-left direction up to the positions immediately above the right and left upper members. Accordingly, a resistance to deformation caused by the load imposed on the traveling vehicle in the width direction of the vehicle can be increased. As a result, the stability and controllability can be maintained, and noise and vibration can be reduced.

According to the present application, a vehicle front body structure capable of increasing the strength of the damper base while preventing an increase in the number of components and a decrease in flexibility in design can be provided.

BRIEF DESCRIPTION OF THE DRAWINGS

The advantages of the disclosure will become apparent in the following description taken in conjunction with the following drawings.

FIG. 4 is a plan view of the damper base.

DETAILED DESCRIPTION

Exemplary embodiments of the present application are described in detail below with reference to FIGS. 1 to 9. In FIGS. 1 to 9, the same numbering is used for like elements, and description of the elements is not repeated. As used herein, all directions (the "front", "rear", "right", "left", "upward", and "downward" directions) are given from the viewpoint of a driver of the vehicle. Note that the "width direction of a vehicle" is the same as the "right-left direction".

Figure 1:
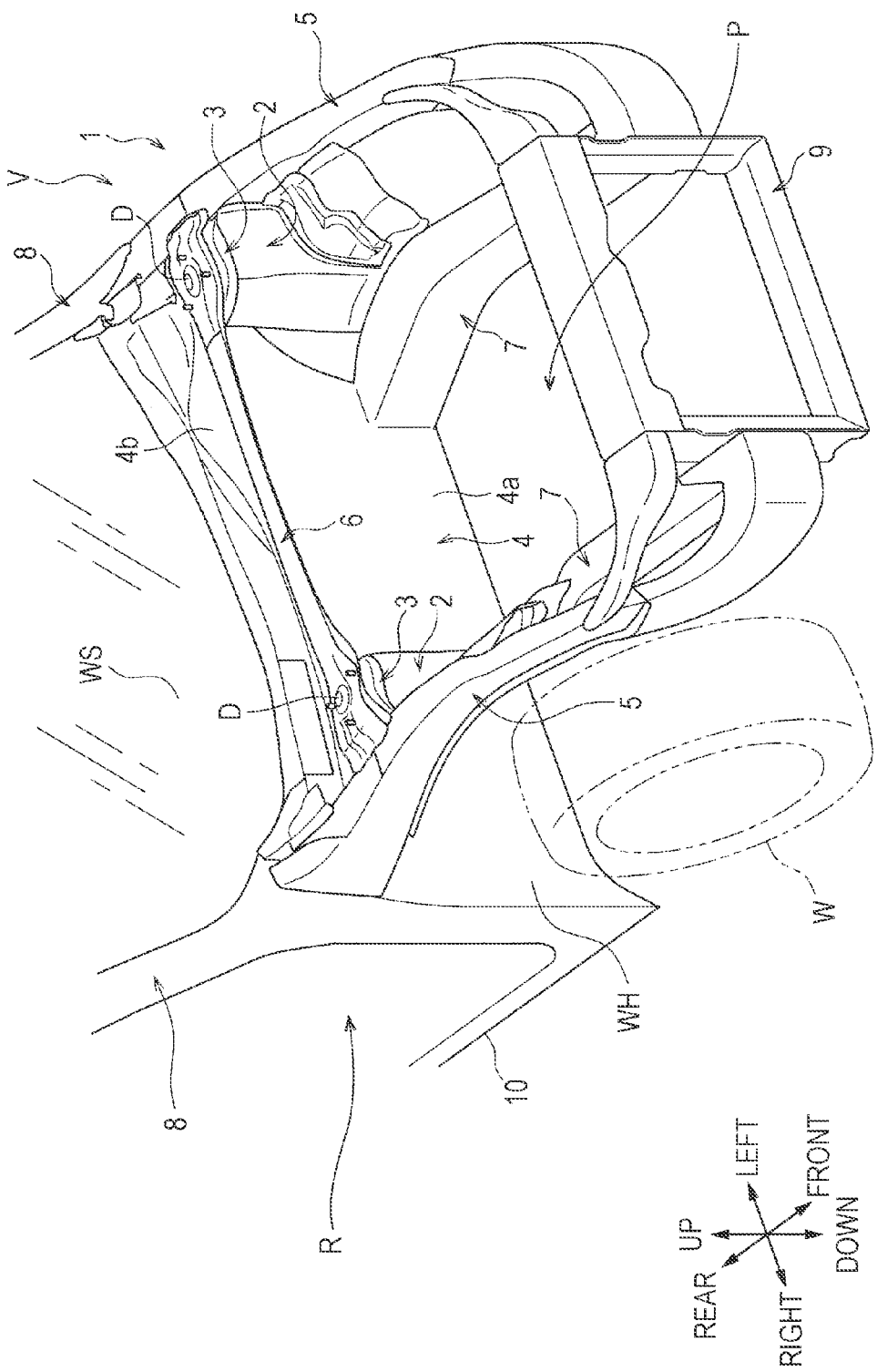
FIG. 1 is a perspective view, from the front, right, and above of a vehicle having a vehicle front body structure according to an exemplary embodiment.

FIG. 1 is a perspective view of a vehicle having a vehicle front body structure according to the present exemplary embodiment when viewed diagonally from the front right and from above. As illustrated in FIG. 1, a vehicle V is an automotive vehicle. The vehicle V includes a power unit room P that contains a power unit, such as an engine, a passenger compartment R serving as a space occupied by a passenger, and wheel houses WH each containing a front wheel W. According to the present exemplary embodiment, a vehicle front body structure 1 is a structure of a damper housing 2 and its vicinity provided on each of the right and left sides of the power unit room. The vehicle front body structure 1 includes a pair of right and left damper housings 2, a damper base 3 provided on top of each of the damper housings 2, a dashboard 4 that separates the power unit room P from the passenger compartment R, a pair of upper members 5 disposed on the right and left sides of the power unit room P and extending in the front-rear direction, and a stiffener 6 that is disposed between the right and left damper housings 2 and that bridges the right and left damper housings 2. In addition, the vehicle V includes a pair of right and left front side frames 7, a pair of right and left front pillars 8, a front bulkhead 9, and a pair of right and left side sills 10.

Each of the upper members 5 is a frame member having a hollow section structure and extending in the front-rear direction of the vehicle. The upper member 5 is curved so as to extend diagonally forward and downward. A front end portion of the upper member 5 branches into two separate portions in the up-down direction, which are connected to a front bulkhead 9. In addition, a rear end portion of the upper member 5 is connected to one of the front pillars 8.

The dashboard 4 is formed from a steel plate member. The dashboard 4 separates the power unit room P from the passenger compartment R. The dashboard 4 includes two members, that is, a lower dashboard-lower 4a and an upper dashboard-upper 4b. The dashboard-lower 4a is disposed between the right and left front pillars 8. The dashboard-upper 4b is disposed between the rear end portions of the right and left upper members 5. The dashboard-upper 4b is described in more detail below.

Each of the front side frames 7 is a frame member disposed beneath the upper member 5. The front side frame 7 has a hollow section structure and extends in the front-rear direction of the vehicle. A front end portion of the front side frame 7 is connected to the front bulkhead 9, and a rear end portion of the front side frame 7 is connected to a lower end of the dashboard-lower 4a.

The right and left front pillars 8 are frame members that support the right and left end portions of a front windshield WS and support the right and left end portions of the dashboard-lower 4a. The front pillars 8 have a hollow section structure. The lower end portions of the right and left front pillars 8 are connected to the front end portions of right and left side sills 10 that extend in the front-rear direction on the right and left end portions of the passenger compartment R.

Figure 2:
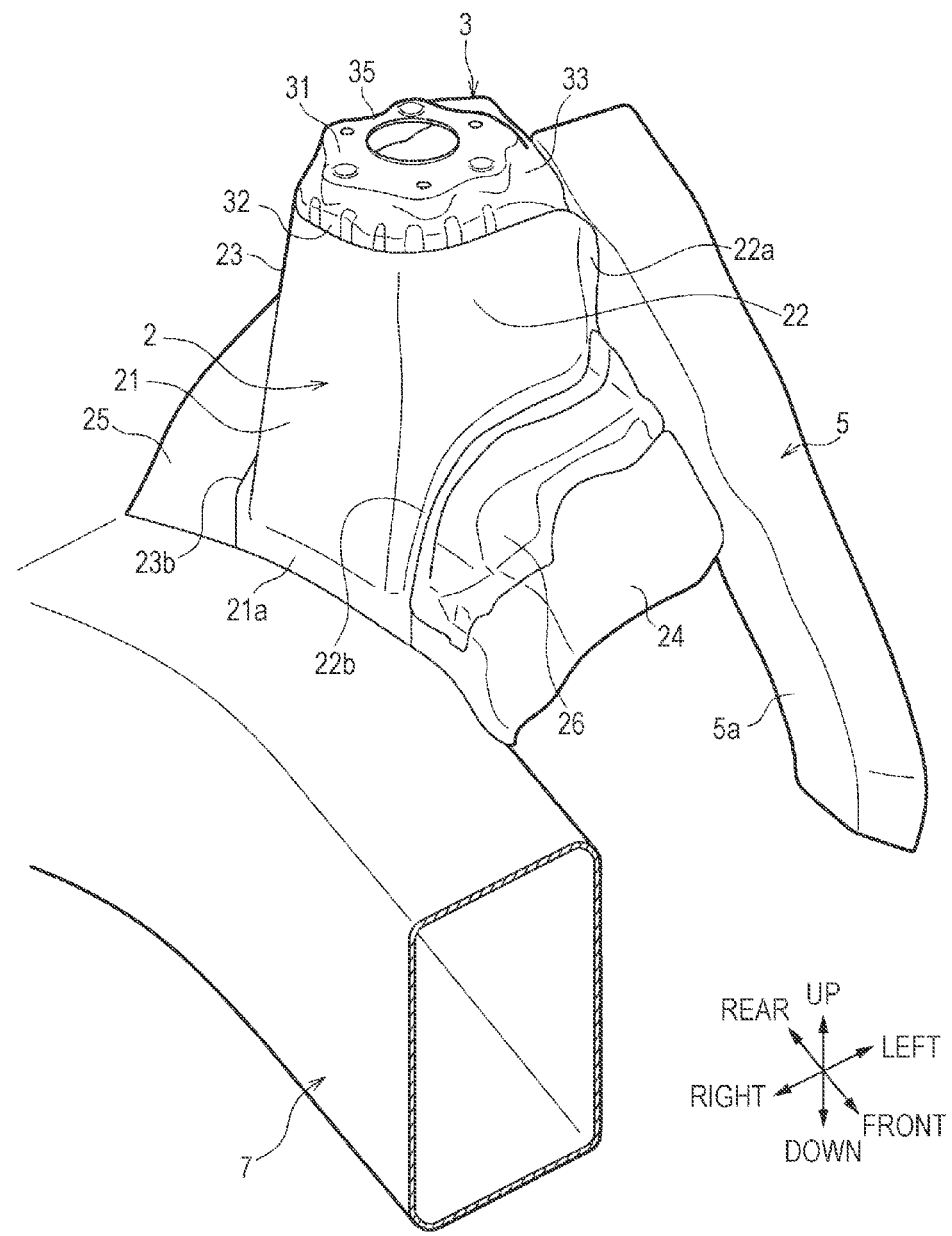
FIG. 2 is an enlarged perspective view of a left damper housing and its vicinity.

FIG. 2 is an enlarged perspective view of the left damper housing and its vicinity. The right and left damper housings 2 have structures that are bilaterally symmetrical, and the right and left damper bases 3 have structures that are bilaterally symmetrical. Accordingly, hereinafter, only the left damper housing 2 and only the left damper base 3 are described. Description of the right damper housing and right damper base 3 is not repeated. As illustrated in FIG. 2, the damper housing 2 is a member that contains a damper D (refer to FIG. 3) of a suspension. The right and left damper housings 2 serve as the right and left side walls of the power unit room P. The damper housing 2 includes an inner side wall 21, a front side wall 22, and a rear side wall 23 and has a substantially U shape in plan view. The damper base 3 is fixed to the upper portion of the damper housing 2 by welding. A lower end portion 21a of the inner wall 21 is joined to the front side frame 7. An end portion of each of the front side wall 22 and the rear side wall 23 on the outer side of the vehicle has a flange formed therein (only a flange 22a of the front side wall 22 is illustrated). The flange is joined to a side surface 5a of the upper member 5 in the vehicle compartment. A lower end portion 22b of the front side wall 22 and a lower end portion 23b of the rear side wall 23 are formed so as to have a substantially arc shape such that the edges thereof are located gradually lower as they come closer to the inner side wall 21.

The lower end portion 22b of the front side wall 22 has a wheel house front 24 joined thereto. The wheel house front 24 is a steel plate member curved in a substantially arc shape. An end portion of the wheel house front 24 on the outer side is joined to the upper member 5, while an end portion on the inner side is joined to the front side frame 7. In addition, a damper housing extension 25 is joined to the lower end portion 23b of the rear side wall 23. The damper housing extension 25 is a steel plate member curved in a substantially arc shape. An end portion of the damper housing extension 25 on the outer side is joined to the upper member 5, while an end portion on the inner side is joined to the front side frame 7. In addition, the rear end portion of the damper housing extension 25 is joined to the dashboard-lower 4a. The wheel house front 24 and the damper housing extension 25 form the upper surface of the wheel house WH. Furthermore, a transmission bracket 26 is joined to a joint region between the damper housing 2 and the wheel house front 24 so as to cover the joint region. The transmission bracket 26 has a substantially hat shape in cross section. The transmission bracket 26 forms a hollow structure together with the wheel house front 24.

Figure 3:
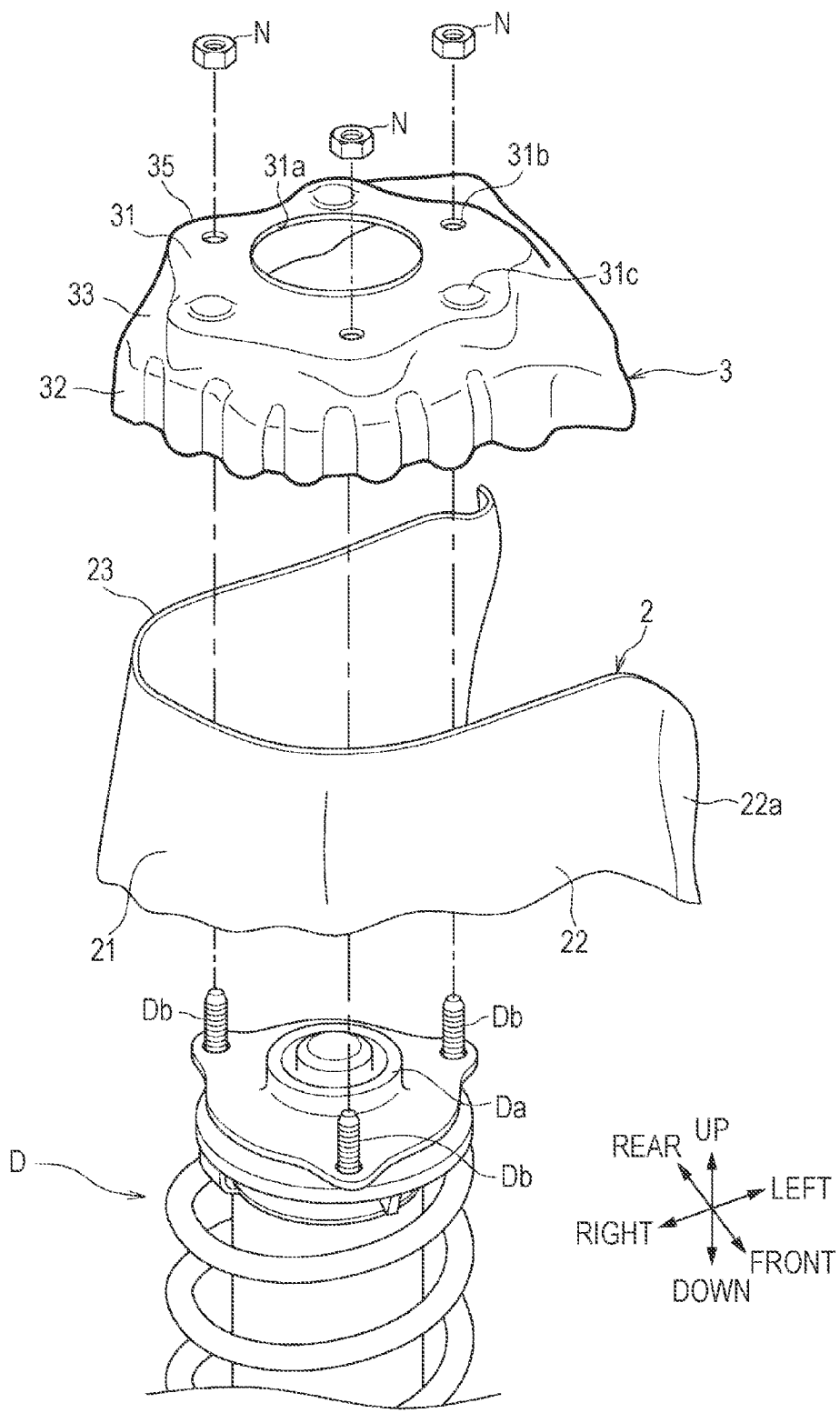
FIG. 3 is an exploded perspective view of the damper housing and a damper base.

FIG. 3 is an exploded perspective view of the damper housing and the damper base. FIG. 4 is a plan view of the damper base. As illustrated in FIG. 3, the damper base 3 is a dished steel member. The damper base 3 is fixed to an upper portion of the damper housing 2 so as to form a top portion of the damper housing 2. The damper base 3 is formed separately from the damper housing 2. The damper base 3 has a sheet thickness greater than that of the damper housing 2. The damper base 3 includes a damper base upper wall 31 to which the damper D is fixed, a damper base side wall 32 fixed to the damper housing 2, and a damper base connecting wall 33 that connects the damper base upper wall 31 to the damper base side wall 32.

Note that since the damper base 3 is formed separately from the damper housing 2, only the sheet thickness of the damper base 3 that receives a heavy load, such as a running load, can be increased. In this manner, an increase in the sheet thickness of the damper housing 2 can be prevented and, therefore, an increase in the weight can be prevented.

The damper base upper wall 31 is a flat part having a substantially star shape in plan view. A ridge line portion 35 extends along the outer periphery of the damper base upper wall 31. That is, the ridge line portion 35 is formed so as to extend along a connecting region between the damper base upper wall 31 and the damper base connecting wall 33 and have a substantially star shape in plan view. The middle portion of the damper base upper wall 31 has an opening 31a formed therein. The opening 31a allows a cylindrical protruding portion Da provided on the head of the damper D to pass therethrough. In addition, the damper base upper wall 31 has three damper fixing portions 31b and three dash upper fixing portions 31c formed therein around the opening 31a.

As illustrated in FIG. 4, the damper fixing portions 31b are through-holes that allow bolt portions Db provided on the head of the damper D to pass therethrough. The three damper fixing portions 31b are disposed so that an imaginary line extending between a first one of the three damper fixing portions 31b and a second one, an imaginary line extending between the second one and a third one, and an imaginary line extending between the third one and the first one form a regular triangle. That is, the three damper fixing portions 31b are disposed at vertexes of a first imaginary regular triangle T1. Note that the three damper fixing portions 31b are disposed such that one of the vertexes of the first imaginary regular triangle T1 is located on the outer side, and a base extending between the other two vertexes is located on the inner side.

Each of the dash upper fixing portions 31c is a part used for fixing a dash-upper front portion 42 (described below) by welding. The dash upper fixing portion 31c is a protrusion having a dome shape that is convex upward. The three dash upper fixing portions 31c are disposed so that an imaginary line extending between a first one of the dash upper fixing portions 31c and a second one, an imaginary line extending between the second one and a third one, and an imaginary line extending between the third one and the first one form a regular triangle. That is, the three dash upper fixing portions 31c are disposed at vertexes of a second imaginary regular triangle T2. The second imaginary regular triangle T2 has a phase sifted from that of the first imaginary regular triangle T1 by 60°.

The three damper fixing portions 31b and the three dash upper fixing portions 31c are alternately disposed on an imaginary circle C at substantially equal intervals. Thus, the three damper fixing portions 31b and the three dash upper fixing portions 31c are disposed at positions corresponding to the vertexes of the ridge line portion 35 having a substantially star shape.

Sections 35a of the ridge line portion 35, that is, sections corresponding to the damper fixing portions 31b and the dash upper fixing portions 31c (sections serving as the vertexes of the substantially star shape) are located outside the imaginary circle C. In addition, a section 35b of the ridge line portion 35 between the damper fixing portion 31b and the dash upper fixing portion 31c intersects the imaginary circle C and, thus, overlaps the imaginary circle C. Alternatively, the section 35b is located inside of the imaginary circle C. In this manner, the area of the damper base upper wall 31 can be minimized and, therefore, film surface deformation of the damper base upper wall 31 can be prevented.

Note that the curvature of the section 35b of the ridge line portion 35 between the damper fixing portion 31b and the dash upper fixing portion 31c is smaller than that of the section 35a corresponding to the damper fixing portion 31b or the dash upper fixing portion 31c (a section serving as one of the vertexes of the substantially star shape). Thus, when the damper base 3 is formed by one-piece press forming, the difference in the circumferential length before and after one-piece press forming can be reduced and, therefore, the occurrence of a wrinkle on the damper base upper wall 31 can be prevented.

Figure 5A:
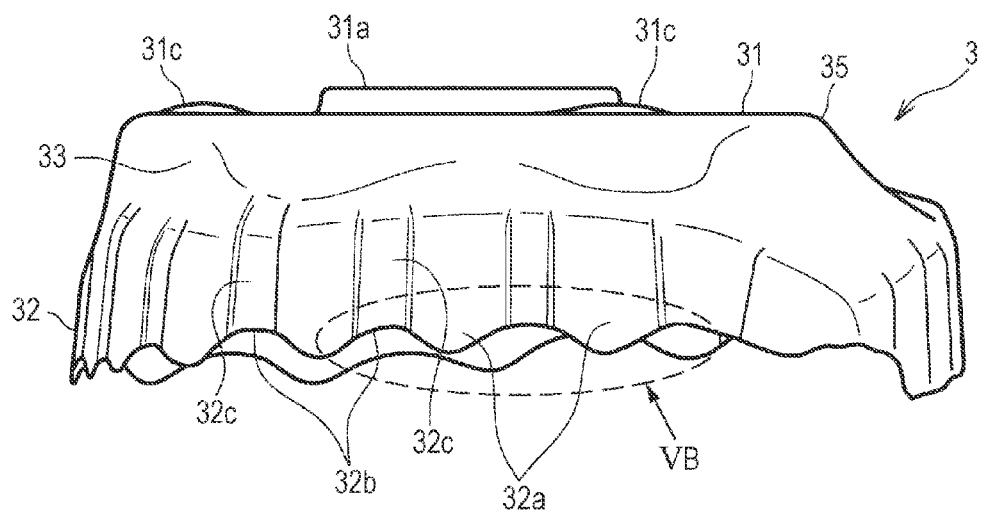
FIG. 5A is a side view of the damper base.
Figure 5B:
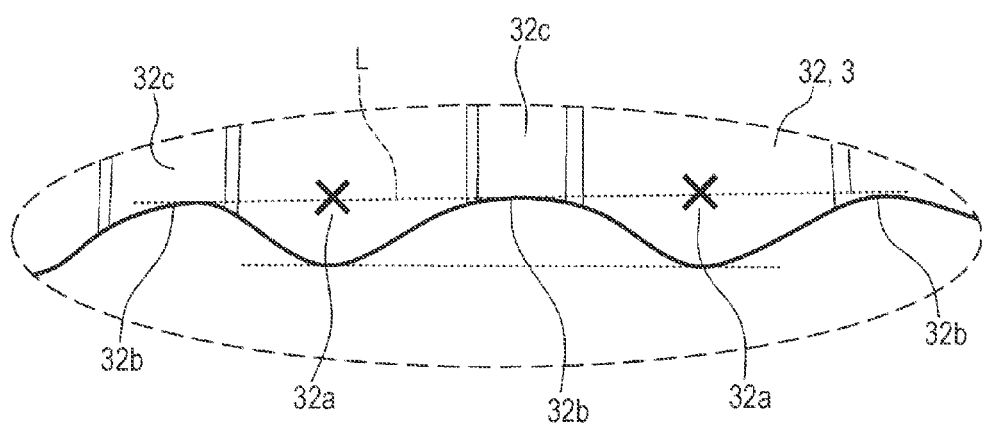
FIG. 5B is an enlarged side view of a VB region illustrated in FIG. 5A.

FIG. 5A is a side view of the damper base, and FIG. 5B is an enlarged side view of a VB region illustrated in FIG. 5A. As illustrated in FIG. 5A, a plurality of separate housing connecting portions 32a joined to the damper housing 2 are formed on the circumferential edge at the lower end of the damper base side wall 32. By performing spot welding with the housing connecting portions 32a being overlapped with the upper end edge of the damper housing 2, the damper base 3 is fixed to the upper portion of the damper housing 2 in an integrated fashion (refer to FIG. 3).

As illustrated in FIG. 5B, a notch portion 32b is formed between every pair of adjacent housing connecting portions 32a by cutting the lower end portion of the damper base side wall 32. According to the present exemplary embodiment, the notch portion 32b is cut into a substantially arc shape so as to reach an imaginary connection line L that passes through the centers of a plurality of the housing connecting portions 32a. That is, the lower end portion of the damper base side wall 32 is formed so as to extend in the circumferential direction and have a ring shape. When viewed from the side, the lower end portion of the damper base side wall 32 has a substantially wave shape. Thus, when the damper base 3 is subjected to one-piece press forming, the difference in the circumferential length before and after one-piece press forming can be reduced, therefore, the occurrence of a wrinkle on the damper base side wall 32 can be prevented.

In addition, as illustrated in FIGS. 5A and 5B, a longitudinal recessed bead 32c that extends in the up-down direction is formed between every pair of adjacent housing connecting portions 32a so as to space apart the damper base side wall 32 from the damper housing 2. That is, each of the longitudinal beads 32c is a concave groove formed in the damper base side wall 32 and has a depth of about 3 mm. When the damper base 3 is fixed to the upper portion of the damper housing 2 by welding, the longitudinal beads 32c separate from the inner surface of the damper housing 2. Thus, the strength of the whole damper base 3 can be increased. In addition, by providing a space between the damper base 3 and the damper housing 2 at positions at which welding is not necessary, the occurrence of noise and vibration are reduced.

Figure 6:
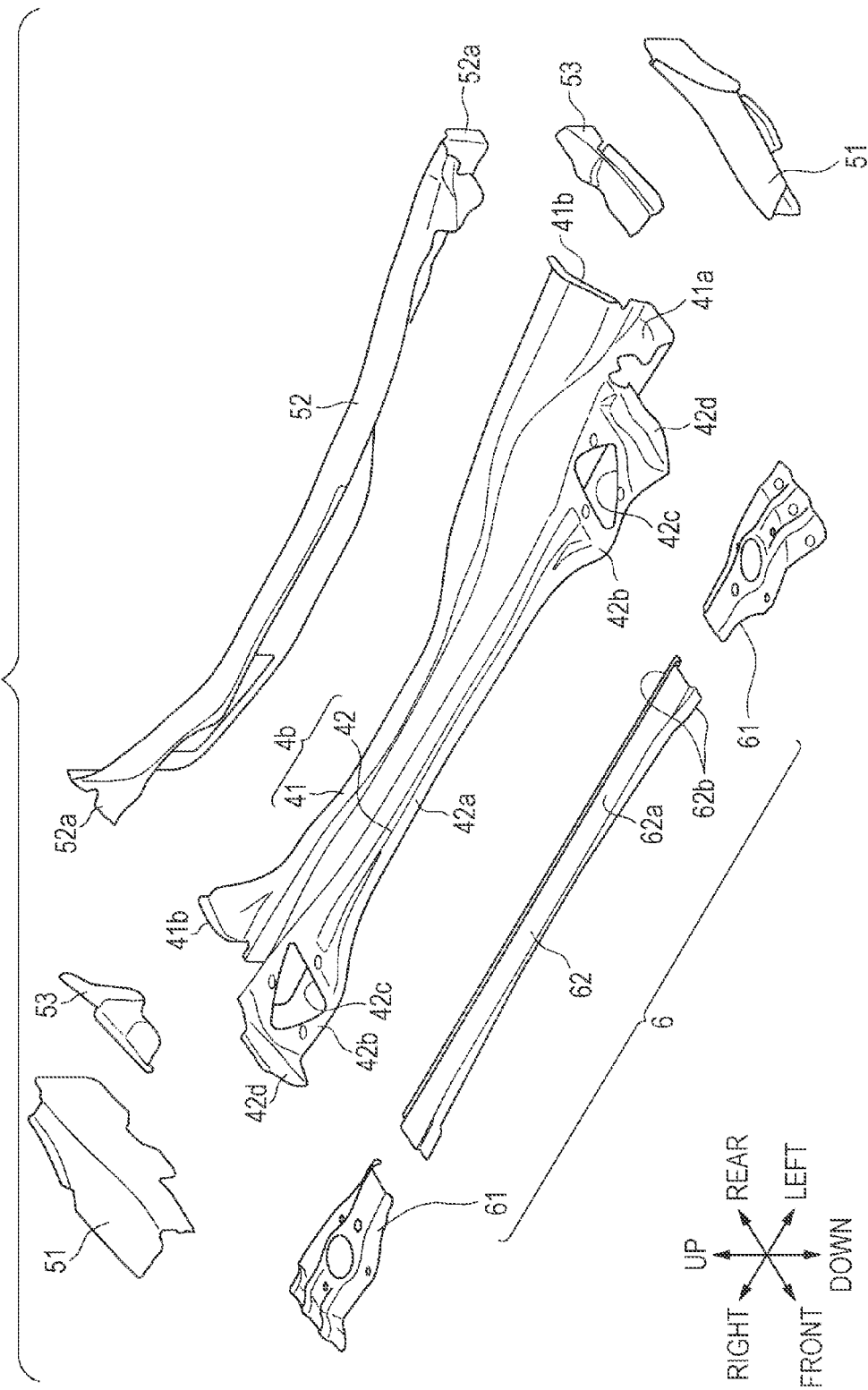
FIG. 6 is an exploded perspective view of a dashboard upper and its vicinity.

FIG. 6 is an exploded perspective view of the dashboard-upper and its vicinity. As illustrated in FIG. 6, the dashboard-upper 4b is a steel plate member extending in the width direction of the vehicle. The dashboard-upper 4b is disposed between the rear end portions of the right and left upper members 5 (refer to FIG. 1). The dashboard-upper 4b includes a dash-upper body 41 extending in the right-left direction and a dash-upper front portion 42 that extends forward from the front edge of the dash-upper body 41 to the position immediately above the damper base 3.

The dash-upper body 41 includes a water drainage conduit 41a in the right-left direction. Right and left end portions 41b of the dash-upper body 41 are connected to the right and left upper members 5 via side members 51. In addition, a front windshield lower 52 that supports the lower end of a front windshield WS is attached onto the dash-upper body 41. Right and left end portions 52a of the front windshield lower 52 are connected to the right and left upper members 5 via hood hinge brackets 53.

An expanded width portion 42b having a width wider than that of a middle portion 42a in the front-rear direction is provided on each of the right end and left end of the dash-upper front portion 42. The expanded width portion 42b is disposed on the damper base 3 and is fixed to the three dash upper fixing portions 31c of the damper base 3 by welding. In addition, the expanded width portion 42b has an opening 42c formed therein. The opening 42c has a triangular shape in plan view. The opening 42c is formed so as to be slightly larger than the first imaginary regular triangle T1 corresponding to the three damper fixing portions 31b of the damper base 3 (refer to FIG. 4). The three damper fixing portions 31b and the damper base upper wall 31 located inside of the three damper fixing portions 31b are exposed through the opening 42c. An end portion 42d on the outer side of the expanded width portion 42b is bent downward and is fixed to the upper surface of the upper member 5 by welding. The dash-upper front portion 42 has the stiffener 6 on top thereof.

The stiffener 6 is a member that functions as a so-called tower bar in cooperation with the dash-upper front portion 42. The stiffener 6 includes a pair of right and left stiffener sides 61 and a stiffener center 62 that connects the right and left stiffener sides 61 to each other.

The stiffener center 62 is a member extending in the width direction of the vehicle. The stiffener center 62 has a substantially hat shape in cross section. The stiffener center 62 includes a bulging portion 62a located in the middle and flanges 62b provided to a front edge and a rear edge of the bulging portion 62a. The flanges 62b are fixed to the upper surface of the dash-upper front portion 42 by welding. In this manner, a closed cross-section S1 (refer to FIGS. 8 and 9) is formed between the dash-upper front portion 42 and the bulging portion 62a.

Figure 7:
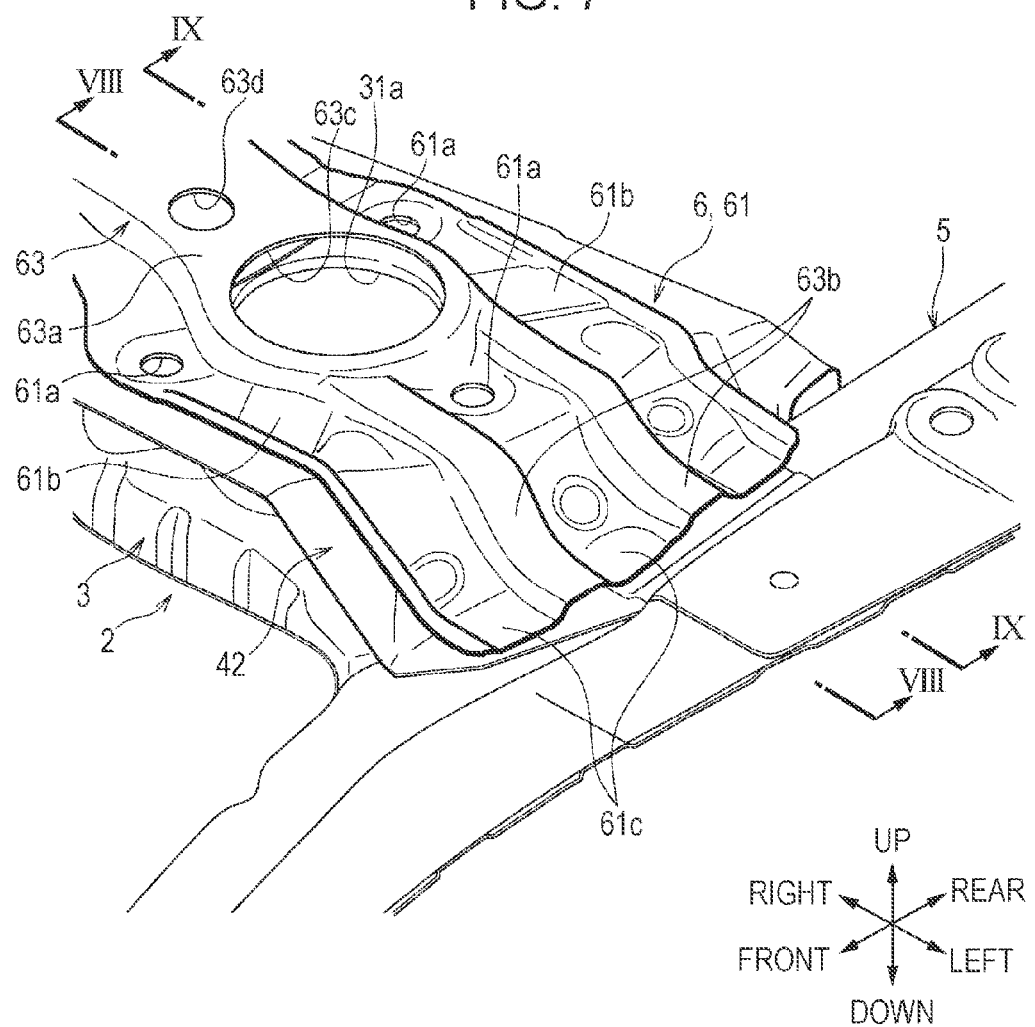
FIG. 7 is a perspective view of a left stiffener side and its vicinity.
Figure 8:
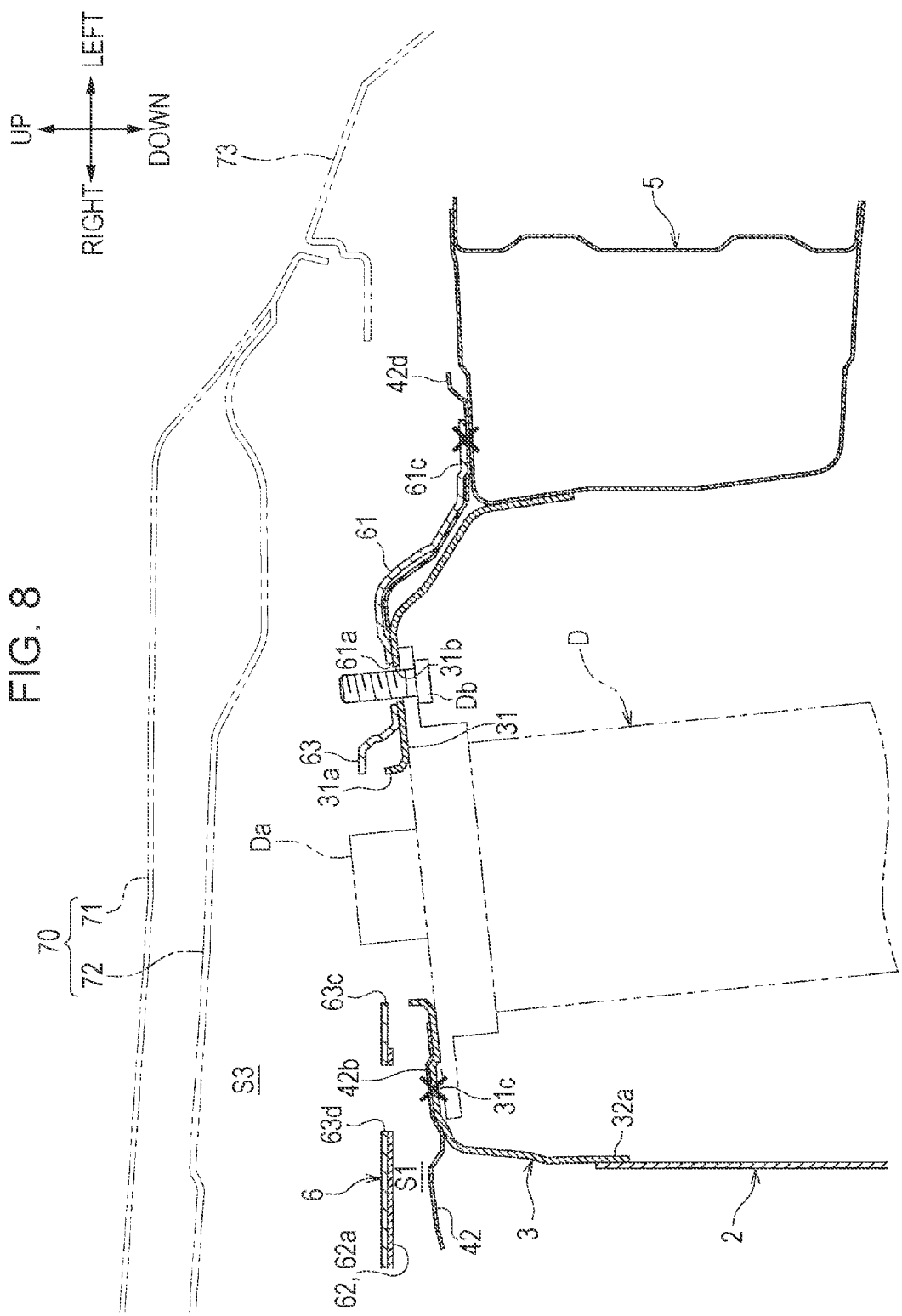
FIG. 8 is a cross-sectional view taken along a line VIII-VIII of FIG. 7.
Figure 9:
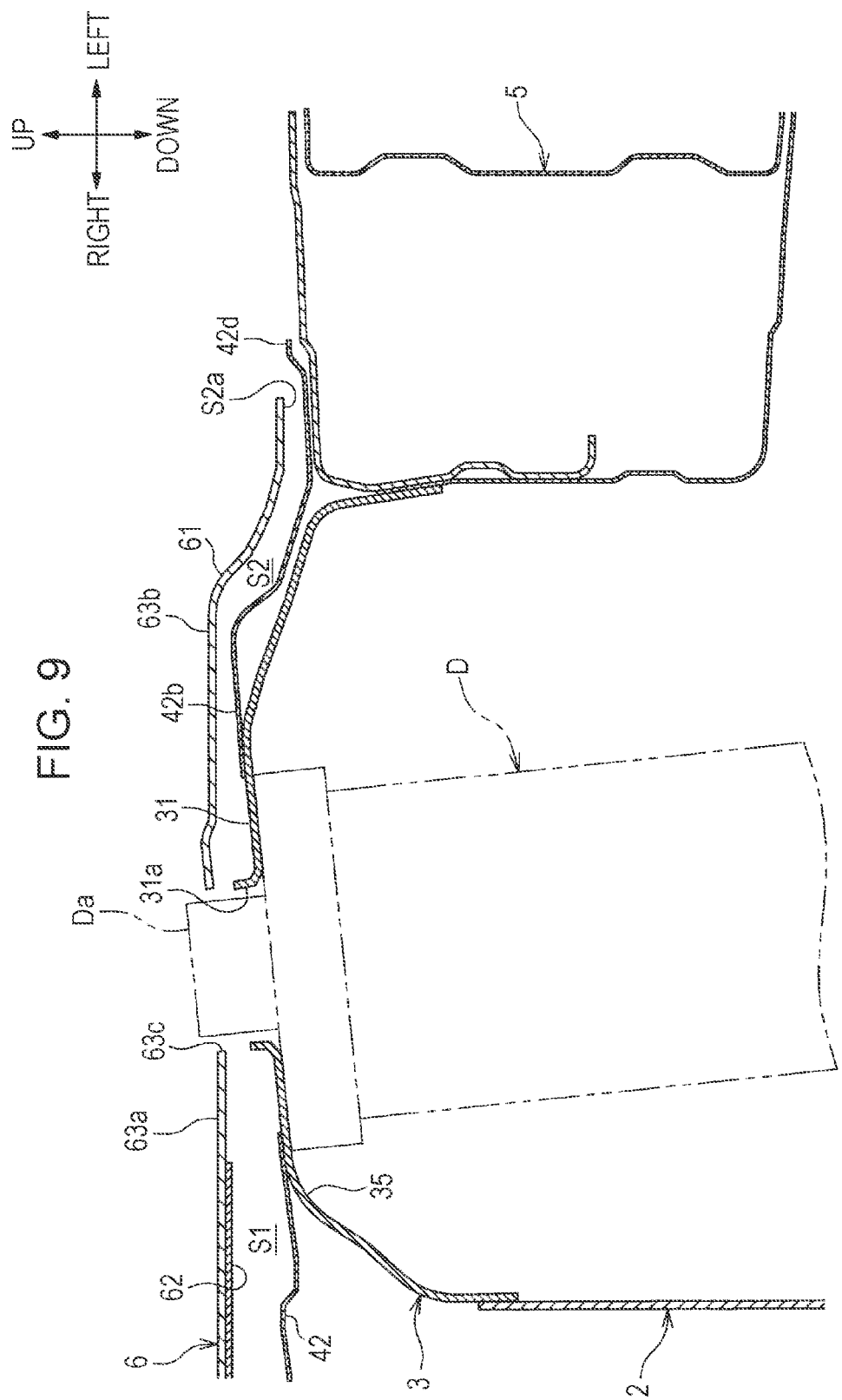
FIG. 9 is a cross-sectional view taken along a line IX-IX of FIG. 7.

FIG. 7 is a perspective view of the left stiffener side and its vicinity. FIG. 8 is a cross-sectional view taken along a line VIII-VIII of FIG. 7. FIG. 9 is a cross-sectional view taken along a line IX-IX of FIG. 7. The right and left stiffener sides 61 have structures that are bilaterally symmetrical. Accordingly, hereinafter, only the left stiffener side 61 is described. Description of the right stiffener side 61 is not repeated.

As illustrated in FIGS. 7, 8, and 9, the stiffener side 61 is a member that is disposed on top of the dash-upper front portion 42 that is disposed on top of the damper base 3. The stiffener side 61 has a width that is wider than that of the stiffener center 62 in the front-rear direction. The stiffener side 61 has three bolt insertion holes 61a at positions each corresponding to one of the three damper fixing portions 31b of the damper base 3. By screwing a nut N (refer to FIG. 3) onto the bolt portion Db of the damper D inserted into the bolt insertion holes 61a, the damper D, the damper base 3, and the stiffener sides 61 are integrally fixed by screwing (refer to FIG. 8).

In addition, the stiffener side 61 has two welding portions 61b at positions corresponding to two dash upper fixing portions 31c on the outer side (adjacent to the upper member 5) among the three dash upper fixing portions 31c of the damper base 3 (refer to FIG. 4). In this manner, the damper base 3, the dash-upper front portion 42, and the stiffener side 61 are stacked and fixed at the above-described two welding portions 61b by three-layer welding. Note that at the other remaining one dash upper fixing portion 31c on the inner side, the damper base 3 and the dash-upper front portion 42 are stacked and fixed by two-layer welding (refer to FIG. 8). In addition, an end portion 61c of the stiffener side 61 on the outer side reaches the upper surface of the upper member 5, and the upper member 5, the dash-upper front portion 42, and the stiffener side 61 are stacked and fixed by welding. An end portion of the stiffener sides 61 on the inner side is connected to the stiffener center 62.

Furthermore, the stiffener side 61 has a bulging portion 63 in the middle in the front-rear direction. The bulging portion 63 bulges in the upward direction of the vehicle. The bulging portion 63 includes a large-width sub-portion 63a on the inner side and two transverse beads 63b on the outer side. The two transverse beads 63b have a width that is smaller than that of the large-width sub-portion 63a. The large-width sub-portion 63a has an opening 63c formed therein at a position corresponding to the opening 31a of the damper base 3 (refer to FIG. 8). The opening 63c is used for a maintenance operation and allows the protruding portion Da of the damper D to be exposed therethrough. In addition, the large-width sub-portion 63a has a through-hole 63d formed therein at a position corresponding to the dash upper fixing portion 31c on the inner side (refer to FIG. 8). The through-hole 63d is used for a welding operation. The two transverse beads 63b are separated from each other in the front-rear direction and extend in the right-left direction in substantially parallel. Thus, a closed cross-section S2 is formed between the two transverse beads 63b and the dash-upper front portion 42 (refer to FIG. 9). The end portion of each of the transverse beads 63b on the outer side reaches a position immediately above the upper member 5. At that position, an end region S2a of the closed cross-section S2 on the outer side is open (refer to FIG. 9).

As illustrated in FIG. 8, a hood 70 that covers the power unit room P is provided above the damper housing 2. The hood 70 is a panel member having a hollow structure formed from a hood skin 71 located on the outer side and a hood inner 72 located on the inner side. A load absorbing space S3 is formed between the hood 70 and the stiffener 6. Note that the hood 70 has a fender panel 73 disposed on the outer side thereof.

According to the present exemplary embodiment, the vehicle front body structure 1 is configured as described above. The operations and advantages of the vehicle front body structure 1 according to the present exemplary embodiment are described next with reference to FIGS. 1 to 9.

As illustrated in FIG. 4, according to the present exemplary embodiment, the vehicle front body structure 1 includes three damper fixing portions 31b and three dash upper fixing portions 31c alternately arranged on an imaginary circle C. In addition, the three damper fixing portions 31b are located at the vertexes of the first imaginary regular triangle T1, and the three dash upper fixing portions 31c are located at the vertexes of the second imaginary regular triangle T2. A section of the ridge line portion 35 outside each of the damper fixing portions 31b and a section of the ridge line portion 35 outside each of the dash upper fixing portions 31c are located outside the imaginary circle C. A section of the ridge line portion 35 between the damper fixing portion 31b and the dash upper fixing portion 31c intersects the imaginary circle C so as to overlap the inside of the imaginary circle C or the imaginary circle C. In this manner, the ridge line portion 35 is formed into a substantially star shape in plan view. Accordingly, although the damper fixing portions 31b and the dash upper fixing portions 31c are disposed inside the ridge line portion 35, the ridge line portion 35 can be made closer to the imaginary circle C to which a stress tends to be concentrated. Thus, the area of the damper base upper wall 31 can be minimized and, therefore, the strength of the damper base upper wall 31 can be increased. As a result, film surface distortion of the damper base upper wall 31 can be prevented. Thus, the stability and controllability can be improved, and noise and vibration can be reduced.

In addition, unlike the technology described in Japanese Unexamined Utility Model Registration Application Publication No. 3-96280 and Japanese Unexamined Patent Application Publication No. 2009-269487, a reinforcing member or a bulging portion provided on the damper base upper wall 31 is not needed. Accordingly, the damper base upper wall 31 can be made flat and, therefore, the dash-upper front portion 42 can be easily welded to the damper base 3. As a result, the number of components can be reduced, and flexibility in the design can be increased. Furthermore, as illustrated in FIG. 8, since the damper base upper wall 31 can be flat, the load absorbing space S3 formed between the damper base 3 and the hood 70 can be increased while maintaining a sufficient space for mounting the stiffener 6 (the tower bar), as compared with, for example, the structure described in Japanese Unexamined Patent Application Publication No. 2009-269487.

In general, when three-layer spot welding is performed, the thickness of a thinner member needs to be greater than or equal to one third of the thickness of a thicker member in order to prevent a hole from being generated on the thinner member due to Joule heat. Accordingly, if the sheet thickness of the damper base upper wall 31 is large, the sheet thicknesses of the other members are inevitably large. Consequently, it is difficult to employ spot welding and, therefore, bolt connection is employed. However, according to the present exemplary embodiment, by forming the ridge line portion 35 in a substantially star shape, the sheet thickness of the damper base upper wall 31 can be reduced from that of an existing one while maintaining the rigidity of the damper base upper wall 31. As a result, three-layer spot welding can be employed.

In addition, as illustrated in FIG. 4, since the ridge line portion 35 is formed in a substantially star shape, the bending angle of the section 35b of the ridge line portion 35 between the damper fixing portion 31b and the dash upper fixing portion 31c can be gentle. Thus, the difference in the circumferential length before and after one-piece press forming of the damper base 3 can be reduced and, therefore, the occurrence of a wrinkle on the damper base upper wall 31 can be prevented.

Furthermore, as illustrated in FIGS. 5A and 5B, according to the present exemplary embodiment, a plurality of housing connecting portions 32a to be connected to the damper housing 2 are separately formed on the circumferential edge at the lower end of the damper base side wall 32. In addition, the notch portion 32b is formed between every pair of adjacent housing connecting portions 32a by cutting the lower end portion of the damper base side wall 32 up to at least the imaginary connection line L that passes through the centers of the housing connecting portions 32a. Accordingly, when, for example, the damper base 3 is subjected to one-piece press forming, the difference in the circumferential length before and after one-piece press forming can be reduced by the notch portions 32b and, therefore, the occurrence of a wrinkle can be prevented. In addition, the weight of the damper base can be reduced by the presence of the notch portions 32b.

Still furthermore, according to the present exemplary embodiment, the longitudinal recessed bead 32c that extends in the up-down direction is formed between every pair of adjacent housing connecting portions 32a so as to separate the damper base side wall 32 from the damper housing 2. Accordingly, the rigidity of the damper base 3 can be increased. In addition, by providing a space between the damper base 3 and the damper housing 2 at positions at which welding is not necessary, the occurrence of noise and vibration can be reduced.

Note that the damper base 3 to which a major load, such as a running load, is input requires a sheet thickness that is greater than that of the damper housing 2. Accordingly, if the damper base 3 and the damper housing 2 are integrally formed, the sheet thickness of the damper housing 2 is increased and, thus, the weight is increased. The increase in weight has an adverse effect on the stability and controllability and fuel consumption of the vehicle. However, according to the present exemplary embodiment, since the damper base 3 is formed separately from the damper housing 2, the sheet thickness of only the damper base 3 can be increased (to the necessary thickness). Thus, an increase in the sheet thickness of the damper housing 2 can be prevented, and an increase in the weight can be prevented.

Still furthermore, as illustrated in FIGS. 6 and 7, according to the present exemplary embodiment, an end portion of the stiffener 6 that is disposed between the damper housings 2 together with the dash-upper front portion 42 (more precisely, the end portion 61c of the stiffener sides 61 on the outer side) is fixed to the upper member 5. Accordingly, as compared with the case in which the end of the stiffener 6 is fixed to the damper base 3, concentration of a stress on the damper base 3 can be prevented and, therefore, deformation of the damper base upper wall 31 can be further reduced. In addition, since the running load input from the damper D can be distributed over the upper members 5, the rigidity of the whole body can be increased more. As a result, the stability and controllability of the vehicle can be improved, and noise and vibration can be reduced.

Yet still furthermore, as illustrated in FIG. 9, according to the present exemplary embodiment, the stiffener 6 disposed between the damper housings 2 together with the dash-upper front portion 42 has the bulging portions 62a and 63 that form the closed cross-sections S1 and S2, respectively, together with the dash-upper front portion 42. The bulging portion 62a of the stiffener center 62 and the bulging portion 63 of the stiffener side 61 (more precisely, the large-width sub-portion 63a and the transverse beads 63b) are continuously formed all over the stiffener 6 in the right and left direction and, thus, the closed cross-sections S1 and S2 are formed. Accordingly, a resistance to deformation caused by the load imposed on the traveling vehicle in the width direction is high, and the running load can be distributed. Thus, the rigidity of the body can be increased. As a result, the stability and controllability can be maintained, and noise and vibration can be reduced.

A damper base of a vehicle front body structure according to a modification is described below with reference to FIG. 10. Note that in FIG. 10, the same numbering is used for like elements in the above-described exemplary embodiment, and description thereof is not repeated.

Figure 10:
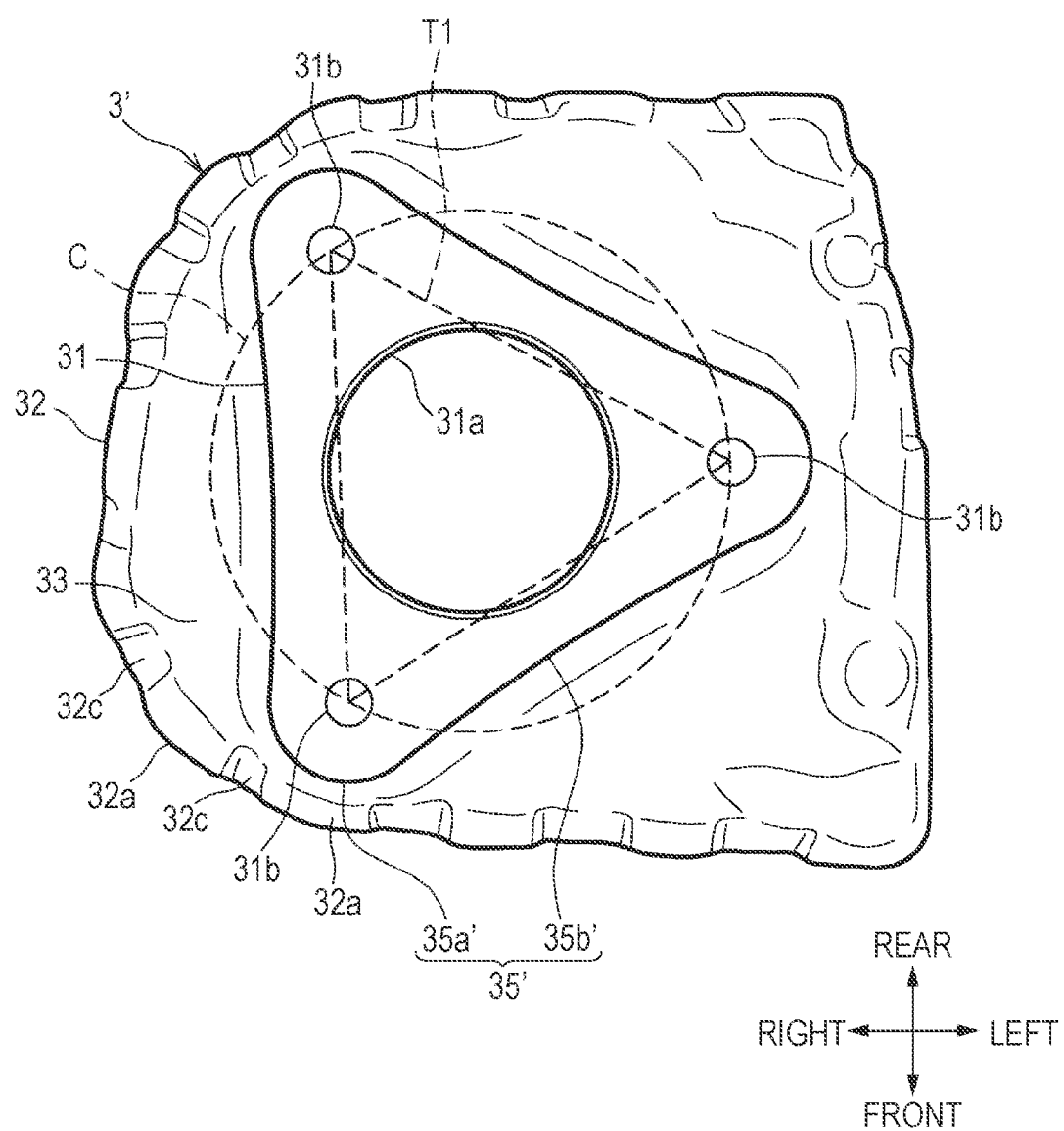
FIG. 10 is a plan view of a damper base of a vehicle front body structure according to a modification.

FIG. 10 is a plan view of a damper base of a vehicle front body structure according to a modification. As illustrated in FIG. 10, according to the modification, a damper base 3' differs from the damper base according to the above exemplary embodiment in that the damper base 3' does not include the dash upper fixing portion 31c (refer to FIG. 4) that fixes the dash-upper front portion 42, and a ridge line portion 35' has a substantially wave shape (a substantially triangular shape) instead of a substantially star shape. That is, the vehicle front body structure according to the modification has a structure in which the dash-upper front portion 42 is not fixed on the damper base 3' by welding.

According to the modification, in the damper base 3', three damper fixing portions 31b are disposed on the imaginary circle C at substantially equal intervals. A section of the ridge line portion 35' outside each of the damper fixing portions 31b is disposed outside the imaginary circle C. A section of the ridge line portion 35' between the damper fixing portions 31b intersects the imaginary circle C and is disposed inside the imaginary circle C. In this manner, the ridge line portion 35' is formed so as to have a substantially wave shape in which a circular arc (35a') that is convex outward outside the damper fixing portions 31b and a circular arc (35b') that is convex inward between the damper fixing portions 31b are alternately continuously arranged. In addition, since the ridge line portion 35 is formed so as to have a ring shape, the ridge line portion 35 has a substantially triangular shape in plan view in which the damper fixing portions 31b are located at the vertexes. Furthermore, the section 35b' of the ridge line portion 35' located between every pair of the damper fixing portions 31b is curved more gently than the section 35a' located outside each of the damper fixing portions 31b.

In such a configuration, sections of the ridge line portion 35' outside the damper fixing portions 31b are located outside the imaginary circle C, and sections between every pair of the damper fixing portions 31b are located inside the imaginary circle C. Thus, the ridge line portion 35' is formed so as to have a substantially wave shape in plan view. Accordingly, although the three damper fixing portions 31b are disposed inside the ridge line portion 35', the area of the damper base upper wall 31 can be minimized by moving the ridge line portion 35' closer to the imaginary circle C. Thus, the strength can be increased. In this manner, film surface distortion of the damper base upper wall 31 can be prevented and, therefore, the stability and controllability can be improved, and noise and vibration can be reduced.

Yet still furthermore, a reinforcing member or a bulging portion provided on the damper base upper wall 31 is unnecessary. Accordingly, the damper base upper wall 31 can be made substantially flat and, therefore, other components can be easily welded to the damper base 3'. As a result, the number of components can be reduced, and flexibility in the design can be increased. In addition, since the section 35b' of the ridge line portion 35 located between the damper fixing portions 31b is curved more gently than the section 35a' located outside the damper fixing portions 31b, the difference in the circumferential length before and after one-piece press forming of the damper base 3 can be reduced and, therefore, the occurrence of a wrinkle on the damper base upper wall 31 can be prevented.

While the vehicle front body structure 1 according to the exemplary embodiment and the vehicle front body structure according to the modification have been described with reference to FIGS. 1 to 10, the present application are not limited thereto. Various modifications can be made within the spirit and scope of the present application.

For example, while the exemplary embodiment has been described with reference to three damper fixing portions 31b and three dash upper fixing portions 31c provided in the damper base 3, the present application is not limited thereto. The number may be two or three or more. Moreover, while the six-pointed star shape is used as an example of "star-shape," the present application is not limited thereto. Other type of star shape may be used and covered by the accompanying claims.

I claim:

1. A vehicle front body structure comprising:
a pair of damper housings forming right and left side walls of a power unit room of a vehicle, each of the pair of damper housings containing a damper;
right and left damper bases, each disposed on an upper portion of corresponding one of the pair of damper housings for fixing the damper thereto; and
a dashboard upper forming an upper portion of a dashboard separating the power unit room from a vehicle compartment, the dashboard upper including a dash-upper front portion extending, in a front direction of the vehicle, up to at least a position immediately above the right and left damper bases, each of right and left end portions of the dash-upper front portion in the vehicle width direction being fixed to a corresponding one of the right and left damper bases,
wherein each of the right and left damper bases includes a damper base upper wall for attaching the damper thereto, a side wall portion, three damper fixing portions disposed on the damper base upper wall to fix the damper to the damper base upper wall, three dash upper fixing portions disposed on the damper base upper wall to fix the dash-upper front portion to the damper base upper wall,
wherein the damper base upper wall is connected to the side wall portion so as to have a ridge line portion at a boundary between the damper base upper wall and the side wall portion such that the ridge line portion extends along a circumference of the damper base upper wall,
wherein the three damper fixing portions and the three dash upper fixing portions are alternately positioned on a single imaginary circular line superimposed on an upper surface of the damper base upper wall such that imaginary lines extending between every pair of the three damper fixing portions form a first substantially regular triangle, and imaginary lines extending between every pair of the three dash upper fixing portions form a second substantially regular triangle, and
wherein the damper base upper wall has a substantially wave shape having a trough of the wave shape located between one of the three damper fixing portions and an adjacent dash upper fixing portion such that a section of the ridge line portion between the one of the three damper fixing portions and the adjacent dash upper fixing portion is recessed inward to intersect the single imaginary circular line and a section of the ridge line portion surrounding the damper fixing portions and a section of the ridge line portion surrounding the dash upper fixing portions are located outside the single imaginary circular line.

2. The vehicle front body structure according to claim 1, wherein the damper base further includes a plurality of housing connecting portions disposed on a circumferential edge at the lower end of the side wall portion of the damper base, and a notch portion between a pair of adjacent housing connecting portions.

3. The vehicle front body structure according to claim 2, wherein the notch portion extends from a lower edge of the side wall portion to at least an imaginary connection line passing through centers of the plurality of housing connecting portions.

4. The vehicle front body structure according to claim 1, wherein the damper base further includes a plurality of housing connecting portions disposed on a circumferential edge at the lower end of the side wall portion of the damper base, and a recessed bead that extends in an up-down direction between a pair of adjacent housing connecting portions so as to space apart the side wall portion of the damper base from the damper housing.

5. The vehicle front body structure according to claim 1, further comprising:
   a pair of right and left upper members extending in a front-rear direction of the vehicle on right and left sides of the power unit room; and
   a stiffener disposed on top of the dash-upper front portion attached to the damper base upper wall, the stiffener extending between the pair of damper housings together with the dash-upper front portion;
   wherein right and left end portions of the stiffener are fixed to the right and left upper members, respectively.

6. The vehicle front body structure according to claim 1, further comprising:
   a pair of right and left upper members extending in a front-rear direction of the vehicle on right and left sides of the power unit room; and
   a stiffener disposed on top of the dash-upper front portion attached to the damper base upper wall, the stiffener extending between the pair of damper housings together with the dash-upper front portion;
   wherein the stiffener includes a bulging portion bulging in an upward direction of the vehicle and forming a closed cross-section between the stiffener and the dash-upper front portion, and the bulging portion extends in the right-left direction up to positions immediately above the right and left upper members.

7. The vehicle front body structure according to claim 1, wherein the damper base upper wall has a substantially six-pointed star shape.

* * * * *